United States Patent
Itoh

(10) Patent No.: US 7,806,225 B2
(45) Date of Patent: Oct. 5, 2010

(54) STEERING SYSTEM MOTOR

(75) Inventor: Koichi Itoh, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/278,062

(22) PCT Filed: Jun. 14, 2007

(86) PCT No.: PCT/IB2007/001593

§ 371 (c)(1),
(2), (4) Date: Aug. 1, 2008

(87) PCT Pub. No.: WO2007/144753

PCT Pub. Date: Dec. 21, 2007

(65) Prior Publication Data

US 2009/0133956 A1    May 28, 2009

(30) Foreign Application Priority Data

Jun. 16, 2006  (JP)  .............................. 2006-167195

(51) Int. Cl.
*B26D 5/08* (2006.01)
(52) U.S. Cl. ................ 180/446; 310/179; 310/184; 310/198; 310/185
(58) Field of Classification Search .............. 180/144; 310/179, 184, 185, 198
See application file for complete search history.

(56) References Cited

U.S. PATENT DOCUMENTS

| 7,157,875 B2 * | 1/2007 | Kamen et al. ............... 318/434 |
| 2005/0174006 A1 * | 8/2005 | Kolomeitsev et al. ....... 310/180 |

FOREIGN PATENT DOCUMENTS

| JP | 6 113517 | 4/1994 |
| JP | 7 222419 | 8/1995 |
| JP | 2002 142397 | 5/2002 |
| JP | 2002 369481 | 12/2002 |
| JP | 2004 201364 | 7/2004 |
| JP | 2005 237068 | 9/2005 |
| JP | 2006 158174 | 6/2006 |
| WO | 02 063760 | 8/2002 |

* cited by examiner

*Primary Examiner*—Lesley Morris
*Assistant Examiner*—Jacob Knutson
(74) *Attorney, Agent, or Firm*—Oblon, Spivak, McClelland, Maier & Neustadt, L.L.P.

(57) ABSTRACT

A plurality of magnetic pole bodies, provided on a stator of a steering motor, are divided into two electrically independent groups. Each group includes i) six magnetic pole bodies that are arranged in succession and ii) a corresponding number of magnetic pole bodies arranged opposing those six magnetic pole bodies. The two groups vibrate only slightly when operating normally. However, if one of the groups fails, vibration of the stator from elastic deformation in an undulating manner in the circumferential direction will increase, thereby alerting the driver of an abnormality in the steering motor. This increases the likelihood of measures being taken promptly to fix the abnormality in the steering motor, thus improving fail-safe performance.

7 Claims, 6 Drawing Sheets

STEERING SYSTEM MOTOR

BACKGROUND OF THE INVENTION

1. Field of the Invention

The invention relates to a motor provided in a steering system, and more particularly, to a steering system motor in which a starter of the motor is divided into a plurality of systems that are electrically independent from one another.

2. Description of the Related Art

Examples of a steering system motor include a motor, which serves as a power source for assisting with steering, and a motor, which serves as a power source for steering wheels. A vehicle is typically provided with a system for assisting with steering, i.e., a power steering system. The motor of a power steering system is sometimes an electromagnetic motor that is mounted, for example, near the steering column or a rack-and-pinion mechanism. Also, in a steer-by-wire type steering system, in which the wheels are steered by controlling a power source of a steering portion, the operating force that is input to an operating member, such as a steering wheel, is not transmitted to the steering portion, instead a motor that serves as the power source of the steering portion is provided for steering the wheels. In addition, a motor that applies an appropriate amount of resistance may also provided on the operating member.

The steering system motor described above greatly affects the steering so preferably it incorporates a fail-safe. For example, Japanese Patent Application Publication No. JP-A-2005-237068 describes an electromagnetic motor in which the starter is divided into two systems so that if one system fails, the wheels can be steered with the remaining system. The starter of this electromagnetic motor is symmetrically divided on a plane into two. When the system on one side fails, magnetism is generated by the other system on the other side, which causes the rotor to vibrate. This vibration alerts the driver that the motor has failed. As a result, it is expected that the driver will refrain from making any sudden steering operations and promptly have the motor repaired. In addition, Japanese Patent Application Publication No. JP-A-7-222419 describes a related electromagnetic motor having a single system starter.

With the electromagnetic motor described in JP-A-7-222419, if the single system starter fails, steering assist is of course disabled, i.e., the wheels are no longer able to be steered by the motor. Thus, the motor is not considered very reliable. In comparison, with the electromagnetic motor described in JP-A-2005-237068, even if one system fails the motor can still operate, at which time a relatively large vibration is generated. However, because it is difficult to accurately synchronize the power of the two systems, a relatively small vibration tends to be generated even when both systems are operating normally. This problem may make it difficult to enhance the practical use of a conventional steering system motor. As a result, there is still room for improvement from various standpoints with respect to a steering system motor.

SUMMARY OF THE INVENTION

This invention thus provides a steering system motor that is well suited for practical use, e.g., has improved fail-safe performance, compared with a conventional steering system motor.

A first embodiment of the invention relates to a steering system motor arranged in a steering system that changes the direction in which a wheel is pointed according to an operation of an operating member. The steering system motor includes a stator in which a plurality of magnetic pole bodies, each of which has a coil, that generate magnetism when power is supplied, are arranged in a circle; a rotor that rotates in a state in which the outer peripheral surface of the rotor opposes the inner peripheral surface of the stator or a state in which the inner peripheral surface of the rotor opposes the outer peripheral surface of the stator; and a plurality of power supply portions which supply power to the plurality of magnetic pole bodies of the stator. The plurality of magnetic pole bodies is divided into a plurality of magnetic pole body groups, the number of which corresponds to the number of the power supply portions, with a predetermined one of the power supply portions corresponding to a predetermined one of the magnetic pole body groups. Each magnetic pole body group includes i) a predetermined number of magnetic pole bodies from among the plurality of magnetic pole bodies, which are arranged in succession, and ii) a corresponding number of magnetic pole bodies arranged opposing the predetermined number of magnetic pole bodies in a diameter direction of the circle. In addition, each of the plurality of power supply portions supplies plural phase power to the corresponding magnetic pole body group from among the plurality of magnetic pole body groups, and supplies same phase power which generates magnetism that acts on the rotor in mutually reverse directions in the diameter direction to two of the magnetic pole bodies that oppose each other in the diameter direction.

The steering system motor according to this embodiment may be used as, for example, a power source of a so-called power steering system, a power source for generating resistance force against a steering operation or force for steering wheels or the like in a so-called steer-by-wire type steering system, or another power source. These steering system motors greatly affect the steering of the vehicle so it is desirable that fail-safe performance be taken into account.

In the steering system motor according to this embodiment, the stator is divided into a plurality of systems, i.e., a plurality of magnetic pole body groups, that are electrically independent and power is independently supplied to magnetic pole body groups. Power from one power supply portion is supplied to a plurality of magnetic pole bodies belonging to a given magnetic pole body group. The power supply portion may include, for example, a conducting member that electrically connects a plurality of magnetic pole bodies belonging to the magnetic pole body group that corresponds to the power supply portion with a drive circuit (such as an inverter) provided in the steering system.

Each power supply portion is independent from the others, with electrical conduction between the drive circuit and the plurality of magnetic pole bodies from one power supply portion not affecting the electrical conduction between the driving circuit and the plurality of magnetic pole bodies from another power supply portion. Therefore, if electrical conduction of one or some systems is interrupted due to, for example, a coil becoming disconnected, power can be supplied to another system, thus maintaining a certain amount of driving power. Power may be supplied from one drive circuit to either one magnetic pole body group or to a plurality of magnetic pole body groups.

The motor described in Japanese Patent Application Publication No. JP-A-2005-237068 supplies same phase power from different drive circuits to two opposing magnetic pole bodies when separate drive circuits (such as inverters) are connected to two systems. However, it is difficult to accurately synchronize the power supplied from two different drive circuits so the timing at which the two opposing magnetic pole bodies generate magnetism becomes uneven during normal operation, which causes the rotor to vibrate in the diameter direction. That is, vibration in which the rotor and stator are relatively displaced in the direction orthogonal to their rotational axes results in vibration being generated which is too great to ignore even when operation is normal. The rotor and stator are regarded as rigid bodies and the elastic deformation of those bodies is not taken into account with this vibration.

In contrast, with the steering system motor according to this embodiment, even if separate drive circuits are connected to each power supply portion, same phase power is supplied from the same power supply portion to two magnetic pole bodies that oppose one another in the diameter direction of a circle formed by the plurality of magnetic pole bodies so the power supplied to those two opposing magnetic pole bodies is accurately synchronized. As a result, the forces in the diameter direction that the magnetism of the two opposing magnetic pole bodies exert on the rotor cancel each other out which enables the vibration caused by the relative displacement between the rotor and the stator to be better reduced. Accordingly, the problem of vibration that is too great to be ignored being generated during normal operation may be suppressed. The strength of the two opposing magnetic pole bodies are preferably made equal as soon as possible.

The steering system motor according to this embodiment is such that if one or some of the systems of the starter fail, vibration caused by the relative displacement of the rotor and the stator will not increase. Instead, vibration from the elastic deformation of at least one of the rotor and the stator will increase because one system of the stator includes a plurality of magnetic pole bodies that are arranged in succession. The driver can then be alerted to the abnormality in the motor (i.e., the fact that a portion of the plurality of magnetic pole body groups has failed) by the vibration or vibration noise caused by that elastic deformation. Vibration from elastic deformation tends to occur particularly when the rotor or stator has a hollow cylindrical shape.

For example, when the stator is positioned on the outer periphery of the rotor, it can generally be fixed with the plurality of magnetic pole bodies arranged in a circle on the inner peripheral portion of the cylindrical base. In this case, force in both the circumferential direction and the radial direction acts between the stator and the rotor, with the force in the circumferential direction being the rotary force that drives the motor. On the other hand, the force in the radial direction acts in a direction that pushes each of the plurality of magnetic pole bodies of the stator toward and away from the rotor, thus making the stator vibrate. This vibration is generated by all of the systems of the stator even when they are operating normally, but this movement of the majority of the stator is suppressed by the force between each of the magnetic pole bodies and the rotor so vibration is also suppressed.

On the other hand, when one or some of the systems fail, the magnetic pole bodies of the failed system(s) stop generating a magnetic field such that the portion(s) of the stator in the failed system(s) is able to vibrate freely compared with the other portions of the stator. Therefore, the portion(s) of the stator in the failed system tends to vibrate or the portion(s) of the stator of the system that still operates normally tends to be vibrated by the vibration of the portion(s) of the stator in the failed system. When the stator resonates, the vibration increases even more. A detailed description of this will be given in the example embodiments.

As described above, with the steering system motor according to this embodiment, if one or some of the systems of the stator fail, the vibration or vibration noise of the stator increases, and this vibration or vibration noise makes it easy for the driver to notice that there is an abnormality in the motor (i.e., that one or some of the systems of the stator failed). The vibration or vibration noise of the stator may be relatively small as long as it is large enough or loud enough for the driver to be able to detect that there is some sort of abnormality when operating the operating member. That is, even if it is not possible to identify the nature of the abnormality, at least one of various advantages can be expected by the driver detecting that there is some sort of an abnormality. Some examples of the various advantages are i) that the driver will drive relatively smoothly (e.g., reduce the vehicle speed, make smooth turns or steering operations, etc.), ii) that the driver will be prompted to have the location of the abnormality inspected, and iii) that the driver will be prompted to check the indicator.

Furthermore, the vibration or vibration noise of the steering system motor is generally generated according to a steering operation so if the abnormality is in the steering assist motor, for example, that abnormality may be noticed based on the association between the increased steering resistance and the vibration or vibration noise. Moreover, if the abnormality is in the steering motor, for example, the abnormality may be noticed based on the association between the wheels being somewhat slow to turn and the vibration or vibration noise, and if the abnormality is in the steering reaction force motor, that abnormality may be noticed based on the association between the decrease in resistance against an operation to turn the steering wheel and the vibration or vibration noise. The vibration or vibration noise of the stator can also be comparatively increased; however, the degree of increase should not make the driver mistakenly assume that a major abnormality has occurred (that is, that the vehicle should immediately be stopped).

In this way, with the steering system motor according to this embodiment, when one or some of the systems of the stator fail, vibration large enough to notice is generated in response to a steering operation, which makes it easy for the driver to detect an abnormality. As a result, measures to fix the abnormality in the motor may be taken earlier than they would be otherwise. That is, the steering system motor according to this embodiment generates a certain amount of driving force even if a portion of the plurality of magnetic pole body groups of the stator has failed. In addition, vibration or vibration noise of a degree that is negligible during normal operation may increase when one or some of the systems of the stator fail, thus making it easy for the driver to notice that an abnormality has occurred. That is, a steering system motor is able to be obtained which has superior fail-safe performance and is well suited for practical use.

Each of the magnetic pole bodies in this embodiment may include, for example, a core such as an iron core and a coil wire wound around the core, or may have a coil as its main component and not have a core. Also, in this embodiment of the invention, the magnetic pole bodies of the stator do not necessarily have to be close together. Alternatively, they may be arranged at distances from one another. Further, the number of the plurality of magnetic pole body groups is not particularly limited as long as it is at least two. Moreover, the rotor can include, for example, a permanent magnet, magnetic material such as an iron core, or the like.

According to a second embodiment of the invention, in the first embodiment, the order of the phases of the plural phase power supplied by the plurality of power supply portions to the predetermined number of magnetic pole bodies of the plurality of magnetic pole bodies, which are arranged in succession in each of the plurality of magnetic pole body groups is the same in each magnetic pole body group.

If the plural phase power is three-phase power, for example, each phase is indicated by a symbol such as U, V, or W. Making the order of these phases the same in the plurality of magnetic pole body groups enables the structure of the motor to be simplified.

According to a third embodiment of the invention, in the first or second embodiment, each of the plurality of power supply portions supplies three-phase alternating current as the plural phase power, and each of the magnetic pole body groups includes magnetic pole bodies in multiples of three for both the predetermined number of magnetic pole bodies and the corresponding number of magnetic pole bodies arranged opposing the predetermined number of magnetic pole bodies in the diameter direction.

Three-phase alternating current is used relatively often as power for driving a motor. In this case, the predetermined number of magnetic pole bodies arranged in succession is at least three, as is the number of corresponding magnetic pole bodies that are arranged opposing the predetermined number of magnetic pole bodies, with each of the predetermined number of magnetic pole bodies and each of the corresponding magnetic pole bodies being assigned a phase such as U, V, or W or the like. For example, a U phase is supplied both to a given magnetic pole body as well as to the magnetic pole body opposing that given magnetic pole body in the diameter direction. The three-phase alternating current also includes a pseudo alternating current supplied by an inverter or the like.

According to a fourth embodiment of the invention, in any one of the first to third embodiments, the steering system motor is provided in, and serves as a power source for, a steering apparatus that steers the wheel without using operating force of the operating member.

The steering system motor according to this embodiment is used as a power source for steering the wheels in a steer-by-wire steering system. In a steer-by-wire steering system, the wheels are steered without operating force during normal driving so it is extremely important that the power source not fail easily. In addition, the driver should be quickly alerted of any abnormality in the power source, which is why this embodiment is particularly effective.

A fifth embodiment of the invention relates to a steering system that includes the steering system motor according to any one of the first to fourth embodiments.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
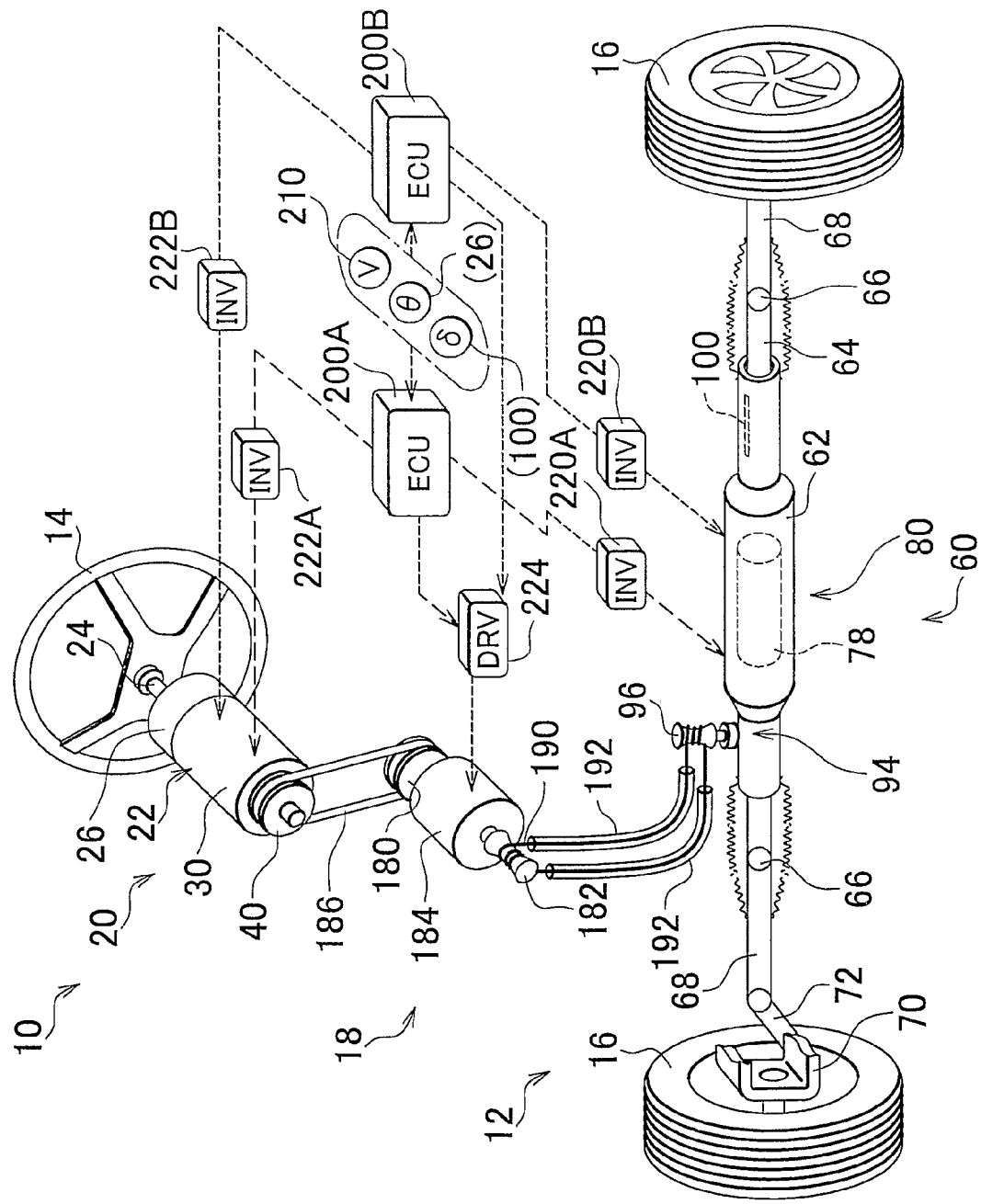
FIG. 1 is a schematic diagram of a steering system according to one example embodiment of the invention.

FIG. 1 is a schematic diagram of a steering system provided with a steering system motor according to one example embodiment of the invention. This steering system is mechanically divided into an operating portion 10 and a steering portion 12. The steering system detects operation of a steering wheel 14, which serves as an operating member, and steers the steered wheels 16 (hereinafter simply referred to as "wheels 16") with the driving force of the steering portion 12 by electrically controlling the steering portion 12 based on the detected operation instead of the operating force of the steering wheel 14. The steering system also includes a connecting portion 18 that mechanically connects the operating portion 10 and the steering portion 12 together when necessary so that the operating force is communicated to the steering portion 12.

The operating portion 10 includes the steering wheel 14 and a steering reaction-force application apparatus 20, which both supports the steering wheel 14 and applies a reaction force against the steering operation (hereinafter "steering reaction force") to the steering wheel 14. This steering reaction-force application apparatus 20 includes a housing 22, a shaft 24, an operating position sensor 26, and a reaction force motor 30. The shaft 24 is rotatably retained in the housing 22 and the steering wheel 14 is mounted to one end of the shaft 24. The operating position sensor 26 detects the operating position based on the rotational position of the shaft 24. The reaction force motor 30 generates steering reaction force by applying rotational driving force to the shaft 24. This reaction force motor 30 is a so-called brushless motor and includes a stator and a rotor. The stator is formed along the circumference on the inner peripheral wall of the housing 22 of the steering reaction-force application apparatus 20. The rotor is fixed to the outer periphery of the shaft 24 so that it does not rotate relative to the shaft 24. The operating position sensor 26 detects the rotational position of the shaft 24 through an optical rotary encoder. An output pulley 40, which is fixed to the front end of the shaft 24 and outputs operating force, is provided on the front end of the steering reaction-force application apparatus 20.

The steering portion 12 is provided with a steering apparatus 60 that steers the wheels 16. This steering apparatus 60 includes a housing 62 and a steering rod 64 that is non-rotatably supported and that extends through the housing 62 in the vehicle width direction. Each end of the steering rod 64 is connected to a tie rod 68 via a ball joint 66. Each tie rod 68 is connected to a knuckle arm 72, which is fixed to a steering knuckle 70 that rotatably supports one of the wheels 16. That is, the steering apparatus 60 steers the wheels 16 by driving the steering rod 64 left and right to rotate the steering knuckles 70.

Figure 2:
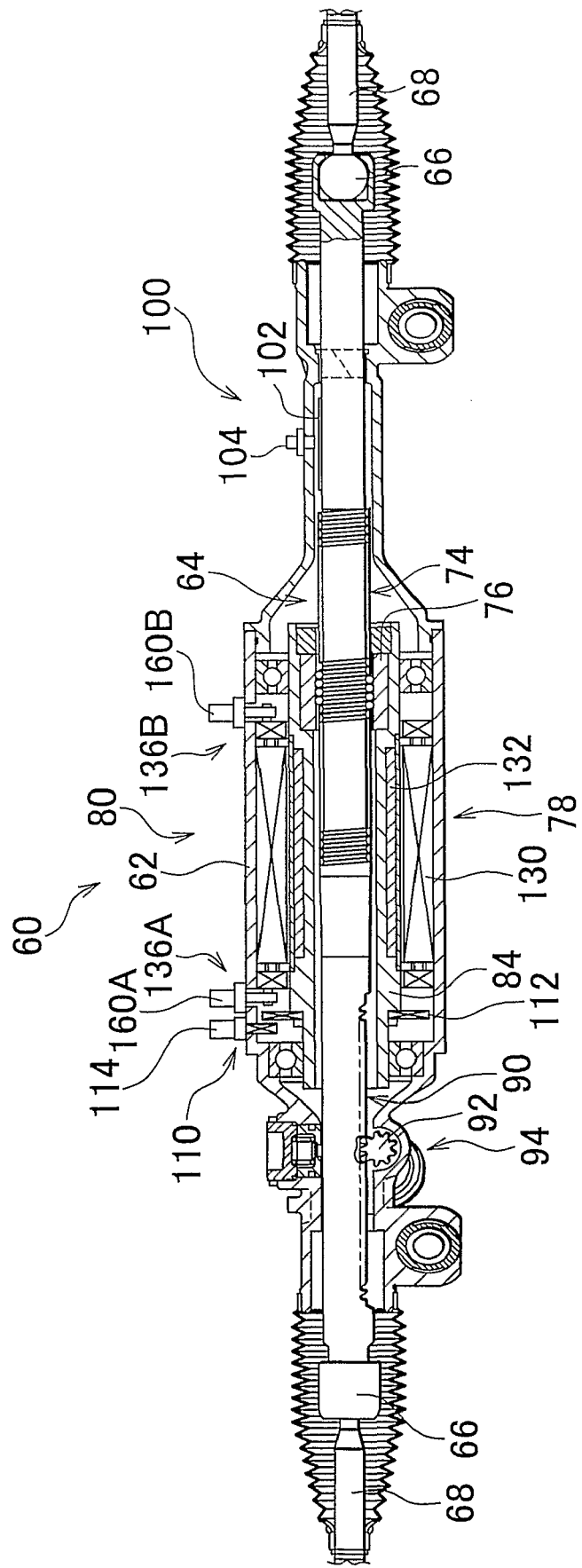
FIG. 2 is a view showing a frame format of a cross-section of a steering apparatus of the steering system.

FIG. 2 is a view showing a frame format of a cross-section of the steering apparatus 60. The steering apparatus 60 includes a first driving portion 80 which drives the steering rod 64 left and right by rotatably driving, using a steering motor 78, a nut 76 which is screwed via bearing balls onto a threaded shaft portion 74 formed on the steering rod 64. The steering motor 78 will be described in detail later. The steering apparatus 60 also includes a second driving portion 94 which drives the steering rod 64 left and right by rotating, using operating force, a pinion gear 92 that is in mesh with a rack gear 90 formed on the steering rod 64. An input roller 96 (see FIG. 1) that receives the operating force is attached to the pinion gear 92.

A steering position sensor 100 that detects the steering position of the steering rod 64 is provided on the housing 62. This steering position sensor 100 is made up of a scale tape 102 and an optical sensor 104. The scale tape 102 has multiple detection portions formed on it at minute intervals and is affixed extending in the axial direction of the steering rod 64. The optical sensor 104 is fixed to the housing 62 and detects the detection portions on the scale tape 102. In addition, the steering apparatus 60 includes a rotational position sensor 110 that detects the rotational position of the motor shaft 84. The rotational position sensor 110 is made up of a rotating plate 112 and an optical sensor 114. The rotating plate 112 has multiple detection portions formed along its periphery at minute intervals and is mounted to the motor shaft 84 so that it does not rotate with respect to the motor shaft 84. The optical sensor 114 is fixed to the housing 62 and detects the detection portions on the rotating plate 112.

Figure 3:
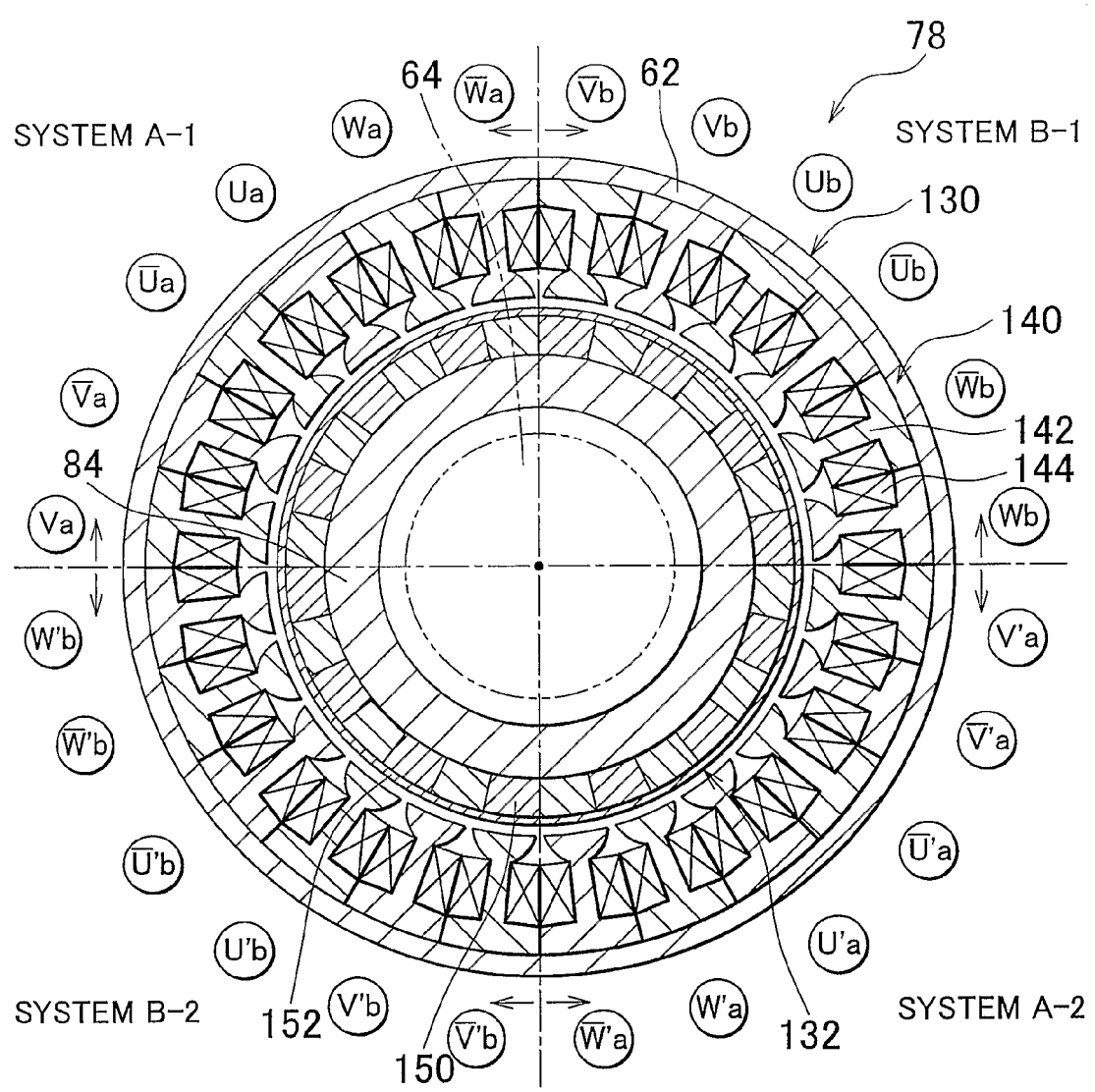
FIG. 3 is a sectional view of a steering motor of the steering system shown cut along a plane orthogonal to the axis of the steering motor.

The steering motor 78 will now be described in detail. FIG. 3 is a sectional view of the steering motor 78 shown cut along a plane orthogonal to its rotational axis. The steering motor 78 is a so-called brushless motor and includes a rotatable motor shaft 84, a stator 130, a rotor 132, and power supplies 136A and 136B (see FIGS. 2 and 4). The motor shaft 84 is cylindrical and allows the steering rod 64 to extend through it. The stator 130 is cylindrical and formed in the central portion of the housing 62, in the axial direction of the motor. The rotor 132 is formed as a cylinder on the outer peripheral portion of the motor shaft 84 and opposes the inner peripheral surface of the stator 130. The power supplies 136A and 136B supply power to the stator 130. The stator 130 includes a plurality (24 in this example embodiment) of magnetic pole bodies 140. The magnetic pole bodies 140 are arranged along the inner wall surface of the housing 62, i.e., in a circle, with almost no gaps in between. That is, the center portion of the housing 62 in the axial direction of the motor functions as a cylindrical base for the stator 130, and the stator 130 includes the plurality of magnetic pole bodies 140 at the central portion of the housing 62 in the axial direction of the motor.

Each magnetic pole body 140 includes a core 142 and a coil 144. The core 142 has a cross-section that is generally of an H-shaped rod shape and is arranged extending in the axial direction of the motor shaft (i.e., in the direction parallel to the axis). The coil 144 is wound around the core 142 such that the coil wire passes through the recessed portions on both sides of the cross-section of the core 142. Meanwhile, the rotor 132 includes a plurality (28 in this example embodiment) of band-shaped permanent magnets 150 (hereinafter also referred to simply as "magnets"). These magnets 150 are arranged along the outer peripheral surface of the motor shaft 84 with almost no gaps between them. The outer peripheral surfaces of the magnets 150 are covered by a covering member 152. The magnets 150 are arranged so that they are magnetized in the radial direction of the rotor 132 and the direction of magnetization of adjacent magnets 150 is reversed.

In this example embodiment, the plurality of magnetic pole bodies 140 that constitute the stator 130 are divided into two groups (i.e., two magnetic pole body groups). That is, they are divided into two systems that are electrically independent from each other. In FIG. 3, one group is represented by system A (the portion denoted by "SYSTEM A-1" and "SYSTEM A-2" in the drawing) and the other group is represented by system B (the portion denoted by "SYSTEM B-1" and "SYSTEM B-2" in the drawing). System A includes system A-1 and system A-2. System A-1 includes six magnetic pole bodies 140 that are arranged in succession, and system A-2 includes six magnetic pole bodies 140 that are arranged opposing the six magnetic bodies 140 belonging to system A-1 in the diameter direction of the circle formed by the plurality of magnetic pole bodies 140 (hereinafter also simply referred to as "diameter direction"). System B is the same as system A, so a detailed description thereof will be omitted.

One phase (designated by the symbols U, V, and W) of a three-phase alternating current is connected via the power supply 136A to each magnetic pole body 140 (the designation "a" or "b" appended to the phase indicates the system). A bar over the symbol indicating the phase indicates that the magnetic pole body 140 is connected to a reverse phase. The absence of a bar indicates that the magnetic pole body 140 is for a positive magnetic pole and a bar indicates that the magnetic pole body 140 is for a reversed magnetic pole. That is, same phase power that generates magnetism in the reverse direction of a magnetic pole body 140 for a positive magnetic pole is supplied to a magnetic pole body 140 for the reverse magnetic pole. Incidentally, in the drawing, a prime (') mark is appended to the symbols indicating the phases of the magnetic pole bodies 140 belonging to systems A-2 and B-2. Also, in this specification, a minus sign in front of the symbols indicating the phases (such as "−Ua") indicates that that magnetic pole body 140 is for a reverse magnetic pole.

Figure 4:
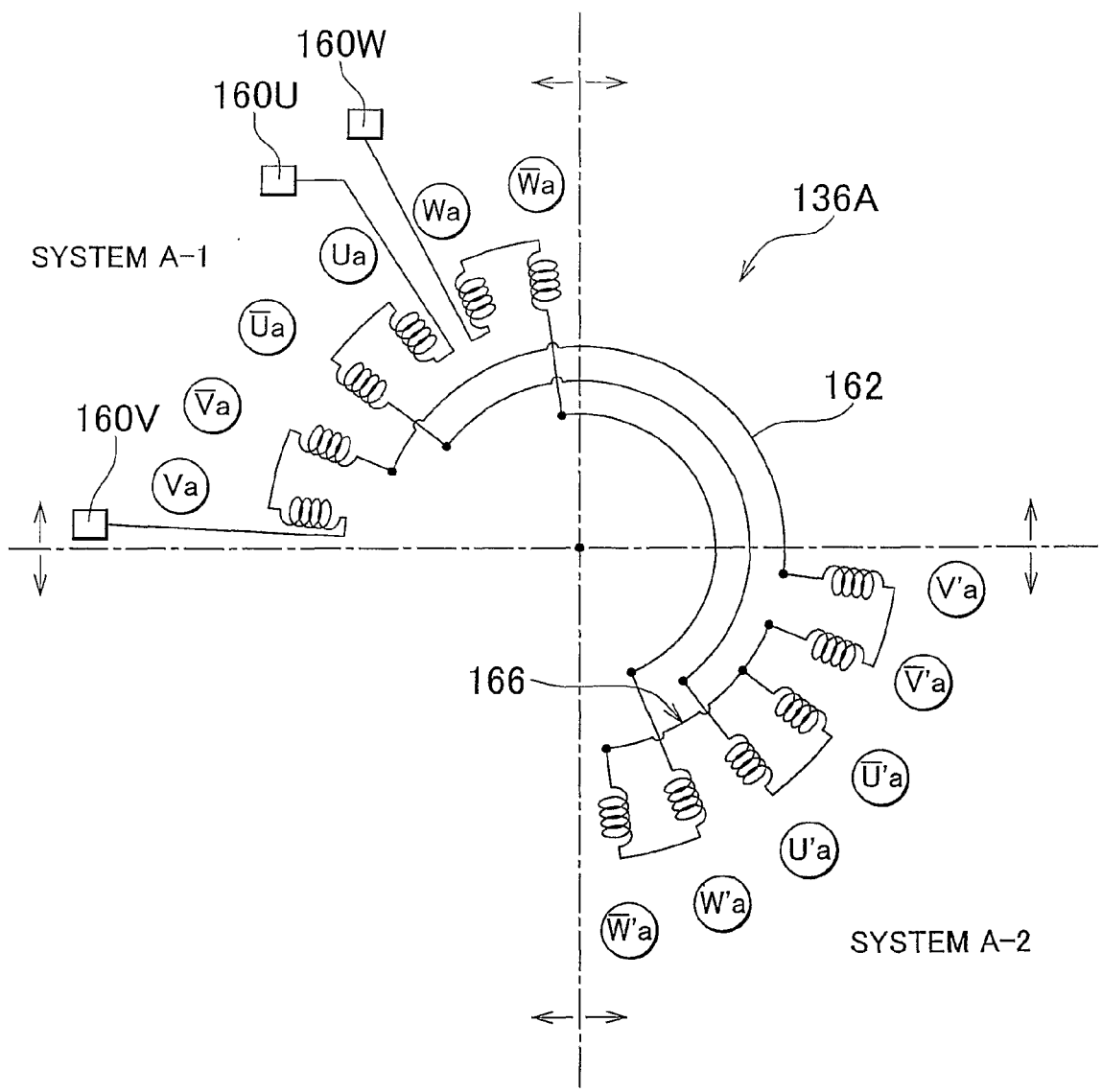
FIG. 4 is a view showing a frame format of a power supply of the steering motor.

FIG. 4 view showing a frame format of the power supply 136A that connects all twelve magnetic pole bodies 140 of system A to an inverter (i.e., a drive circuit) that generates the three-phase alternating current. The power supply 136A includes three connecting terminals 160U, 160V, and 160W (for the U, V, and W phases, respectively) that are connected to the inverter (i.e., the drive circuit), and a conducting member 162 that provides electrical conduction between the three connecting terminals 160U, 160V, and 160W and the twelve magnetic pole bodies 140 via established lines. Four magnetic pole bodies 140 (Va, −Va, Va', and −Va') are connected in series between the connecting terminal 160V of the V phase and a neutral point 166. Also, from among those four magnetic pole bodies 140, the two magnetic pole bodies 140 (Va and Va') for a positive magnetic pole are arranged opposing each other in the diameter direction, as are the two magnetic pole bodies 140 (−Va and −Va') for the reverse magnetic pole. Similarly, with the connecting terminals 160U and 160W of the other phases (i.e., U and W, respectively), four magnetic pole bodies 140 are connected in series between the connecting terminal 160U and the neutral point 166 and four magnetic pole bodies 140 are connected in series between the connecting terminal 160W and the neutral point 166. According to this structure, the power supply 136A supplies power to each of the plurality of magnetic pole bodies 140 belonging to system A independently. The structure of the power supply 136B is substantially the same as that of the power supply 136A. That is, the stator 130 of this example embodiment is divided into two systems, i.e., systems A and B, which are electrically independent from one another. Thus, even if electrical conduction in one of the two systems is lost, power is still supplied to the other system. Therefore, even if one of the two systems fails due to a disconnection, for example, driving force is still generated to steer the wheels 16 using the other system, which is operating normally.

In this example embodiment, the rotor 132 has twenty-eight poles and the polarities of two magnets 150 that oppose one another are the same. In order to reverse the direction in which the magnetism generated by the two opposing magnetic pole bodies 140 acts on the rotor 132 in the diameter direction, the opposing two magnetic pole bodies 140 are either both magnetic pole bodies for positive magnetic poles or both magnetic pole bodies for negative magnetic poles. However, in a form that differs from the example embodiment, when the polarities of the two opposing magnets of the rotor are reversed, for example, (i.e., when the number of rotor poles is 14, for example), the opposing two magnetic pole bodies 140 are a combination of a magnetic pole body for a positive magnetic pole and a magnetic pole body for a negative magnetic pole, which is opposite that described above. Also, the phase order of the power supplied to the six magnetic pole bodies 140 belonging to each system, i.e., system A-1, system A-2, system B-1, and system B-2, is the same, that is, V, U, and W in the clockwise direction. That is, the power supply 136A is structured such that the order of the phases of the power supplied to the plurality of magnetic pole bodies 140 that are arranged in succession in each magnetic pole body group is the same for each magnetic pole body group. As a result, the structures of the power supplies 136A and 136B can be simplified. However, the order of the phases of the power supplied to the plurality of magnetic pole bodies 140 that are arranged in succession in each magnetic pole body group do not necessarily all should be the same for each magnetic pole body group, but may also be different when appropriate.

The connecting portion 18 (see FIG. 1) includes an input pulley 180 that receives operating force, an output roller 182 that outputs operating force, and an electromagnetic clutch 184 that connects the input pulley 180 to the output roller 182 so that operating force can be transmitted between the two. The input pulley 180 is connected by a belt 186 to the output pulley 40, which rotates together with the shaft 24, so that the input pulley 180 rotates according to the steering operation of the steering wheel 14. Meanwhile, the output roller 182 is connected to the input roller 96 of the steering portion 12 via a transfer cable 190 so that the output roller 182 outputs operating force to the steering portion 12. The transfer cable 190 is guided by the guide tube 192, inside of which the transfer cable 190 is able to smoothly slide. One end of the guide tube 192 is fixed to the housing of the electromagnetic clutch 184 so that the guide tube 192 does not move relative to the electromagnetic clutch 184, and the other end of the guide tube 192 is fixed to the housing 62 of the steering apparatus 60 so that the guide tube 192 is fixed to the housing 62 of the steering apparatus 60. When power is not being supplied to the electromagnetic clutch 184, operating force from the steering wheel 14 is transmitted to the steering apparatus 60 via the mechanical connection between the operating portion 10 and the steering portion 12. Also, the reaction force from the steering apparatus 60 is transmitted to the steering wheel 14. On the other hand, when power is being supplied to the electromagnetic clutch 184, the operating portion 10 and the steering portion 12 are mechanically disconnected from one another so that the operating force received from the steering wheel 14 is not transmitted to the steering apparatus 60.

Electronic control units 200A and 200B will now be described. The steering system is controlled by two electronic control units (each of which may hereinafter also be referred to simply as "ECU") 200A and 200B provided in the steering system itself, as shown in FIG. 1. Both ECU 200A and 200B are mainly formed of a computer that includes a CPU, ROM, and RAM and the like. Various sensors such as an operating position sensor 26 ($\theta$), a steering position sensor 100 ($\delta$), the rotational position sensor 110, and a vehicle speed sensor 210 (V) are connected to the ECU 200A and ECU 200B. Also, the ECU 200A is connected to an inverter 220A and an inverter 222A, both of which can provide a variable driving power, as well as to a driver 224 that supplies a set driving power. Similarly, the ECU 200B is connected to an inverter 220B and an inverter 222B both of which can provide a variable driving power, as well as to the driver 224 that supplies the set driving power. When the ECUs 200A and 200B output various control commands to the inverters 220A, 220B, 222A, and 222B and the driver 224, the inverters 222A and 222B supply power to the reaction force motor 30 and the inverters 220A and 220B supply power to the steering motor 78 while the driver 224 supplies power to the electromagnetic clutch 184. Incidentally, power is supplied to the inverters 220A, 220B, 222A, and 222B and the driver 224 from a battery (not shown) mounted in the vehicle.

The inverters 220A, 220B, 222A, and 222B generate three-phase alternating current by turning a plurality of switching elements on and off. Also, the inverters 220A, 220B, 222A, and 222B change the amount of power and rotary torque supplied to the reaction force motor 30 and the steering motor 78 by changing the duty ratio (i.e., the ratio of on-time to off-time of the energizing pulses), which is done by controlling the PWM (pulse width modulation). For example, increasing the duty ratio increases the amount of power supplied, which increases the amount of rotary torque generated in the reaction force motor 30 and the steering motor 78. The ECUs 200A and 200B output command signals that contain information regarding the amount of torque and rotational direction of the reaction force motor 30 and the steering motor 78 to the inverters 220A, 220B, 222A, and 222B. Also, the inverters 220A, 220B, 222A, and 222B each turn the plurality of switching elements on and off based on detection signals from the operating position sensor 26 and the rotational position sensor 110 in order to supply the reaction force motor 30 with power of a phase according to the rotational position of the reaction force motor 30 and supply the steering motor 78 with power of a phase according to the rotational position of the steering motor 78.

The reaction motor 30 described above has basically the same structure as the steering motor 78, although it has different dimensions and output and the like. That is, the stator has a plurality of magnetic pole bodies arranged along the circumference, the plurality of magnetic pole bodies are divided into two groups that are electrically independent from one another, and two power supplies are provided to supply power to each of the two groups. Therefore, even if electrical conduction of one of the groups is interrupted, power can still be supplied to the other group so that steering reaction force can still be generated. In this example embodiment, just as the plurality of magnetic pole bodies 140 of the stator 130 are divided into groups of two systems, there are also two reaction force systems of the steering system. That is, the reaction force motor 30, the steering motor 78, the ECU 200A, the ECU 200B, and the inverters 220A, 220B, 222A, and 222B are each divided into two systems which have the same structure and operate in the same manner independently from each other. The stators of the reaction force motor 30 and the steering motor 78 are also divided into two systems. Therefore, even if one system in the reaction motor 30 and the steering motor 78 fails due to a disconnection or the like, steering reaction force and steering force can still by generated by the other system. In FIG. 1, the connection of system A is shown by the broken line and the connection of system B is shown by the dotted line. Also, in the following description, only one system will be representatively described unless it is necessary to specify between the two systems.

The operation of the steering system will now be described. This steering system is a steer-by-wire type steering system, as described above. Therefore, when running normally, power is supplied to the electromagnetic clutch 184 and operating force that is received from the operating portion 10 is not transmitted to the steering portion 12. Also, the ECUs 200A and 200B steer the wheels 16 by driving the steering motor 78 based on the detection signal from the operating position sensor 26 and control the reaction force motor 30 to apply a steering reaction force to the steering wheel 14 and generate pressure against the steering operation. Similar commands are also output to the inverters 220A and 220B of the two systems such that the same amount of power is supplied to the two groups of the stator 130 in the steering motor 78. The same is also done with respect to the supply of power to the reaction motor 30 from the inverters 222A and 222B of the two systems.

When controlling the steering motor 78, a target value for the power to be supplied to the steering motor 78 is determined to reduce the difference between the target steering position determined based on the detection signal from the operating position sensor 26 and the actual steering position which is the steering position obtained based on the detection signal from the steering position sensor 100. A command indicating that target value is then output to the inverters 220A and 220B and the inverters 220A and 220B supply power corresponding to the commands from the ECUs 200A and 200B to the steering motor 78. As a result, the wheels 16 are steered to the target steering position such that steering of the wheels 16 is performed according to the steering operation. Meanwhile, when controlling the reaction force motor 30, the operating angle and operating speed are obtained based on detection signals from the operating position sensor 26. A target value for power to be supplied to the reaction force motor 30 is then determined to generate a force that is equal to the combined force of a middle position return force, which is a force that acts to reduce the operating angle and return the steering wheel 14 to the middle position, and an attenuation force which is a force that acts to reduce the operating speed. A command indicative of that target value is then output to the inverters 222A and 222B. The middle position return force is relatively large when an operation that increases the steering angle is being performed, and is relatively small when an operation that reduces the steering angle is being performed. When the inverters 222A and 222B supply power corresponding to the commands from the ECUs 200A and 200B to the reaction force motor 30, steering reaction force is generated which gives the driver a feeling of pressure against the steering operation.

The operation when one system fails will now be described. When one system of the steering system fails, for example, when a coil 144 of one of the magnetic pole bodies 140 of the stator 130 in the steering motor 78 becomes disconnected or when one of the inverters 220A and 220B is no longer able to supply power, steering is performed by the system that has not failed. When one of the ECUs 200A or 200B detects the failure of the inverter 220A or 220B or a disconnection of a magnetic pole body 140 belonging to its system, it stops control of the steering motor 78 and outputs a signal indicating that steering is not possible to the ECU 200A or 200B of the system that is operating normally. The ECU 200A or 200B of the system that is operating normally then sets the target value for the power to be supplied to the steering motor 78 larger than normal (e.g., 1.5 times the normal value). If the vehicle is running, the wheels 16 are steered by the driving force of the operational system.

When one system fails, vibration or vibration noise that is greater than normal is produced when the wheels 16 are steered. When steering is performed with the operational system, the stator 130 of the steering motor 78 vibrates, which causes the housing 62 to vibrate, in turn producing vibration noise. This vibration and vibration noise are produced when the wheels 16 are steered so the driver can easily detect the abnormality in the steering system. As a result, it is expected that the driver will drive smoothly, thus reducing the load on the remaining operational system and promptly have the location of the abnormality inspected. In addition, even when the abnormality in the steering system is indicated by an indicator, the vibration or vibration noise of the steering motor 78 makes the driver aware of the abnormality and prompts the driver to look at the indicator. That is, this steering system has superior fail-safe performance and is well suited for practical use.

Figure 5:
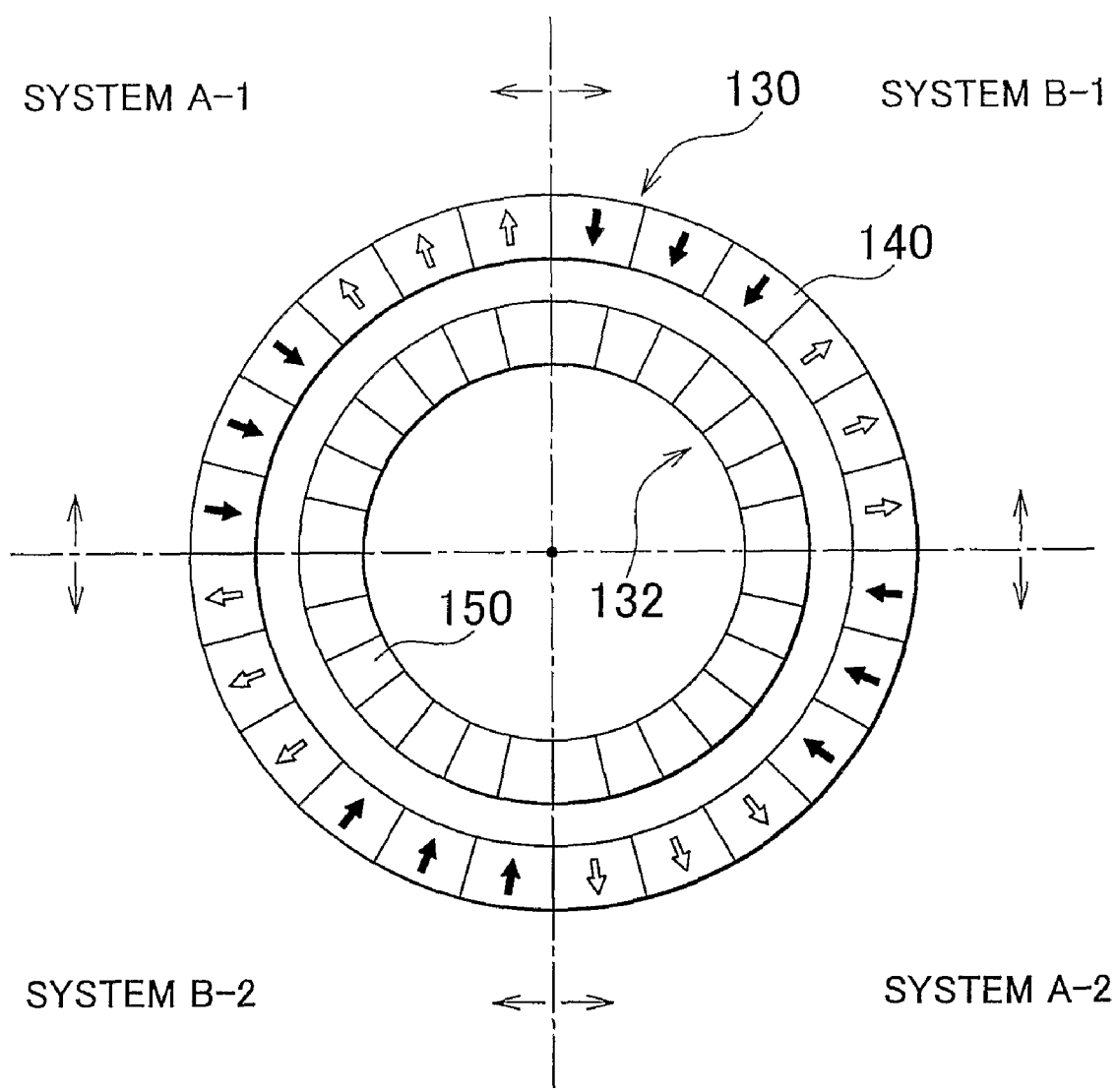
FIG. 5 is a view showing a frame format of force in the radial direction acting on each magnetic pole body of a stator of the steering motor.

Vibration caused by elastic deformation of the stator 130 that occurs when one system fails will now be described. FIG. 5 is a view showing a frame format of force in the radial direction acting on the stator 130 at a given time when both systems are operating normally. Although the amount of force that acts on the magnetic pole bodies 140 differs depending on the amount of power supplied to the magnetic pole bodies 140 and the positional relationship between the magnetic pole bodies 140 and the magnets 150, only the direction of the force is shown in FIG. 5. As shown in the drawing, force in the radial direction acts on each magnetic pole body 140 but the radially outward force and the radially inward force are mixed in the circumferential direction. As a result, movement in the radial direction of the magnetic pole bodies 140 that are connected via the housing 62 is suppressed such that the amount of undulating elastic deformation in the circumferential direction of the stator 130 is relative small so that vibration is negligible. On the other hand, when one system, for example system B, fails, force in the radial direction does not act on the magnetic pole bodies 140 belonging to systems B-1 and B-2 so they move relatively easily in the radial direction. As a result, movement of the magnetic pole bodies 140 belonging to systems A-1 and A-2 in the radial direction becomes difficult to suppress with the magnetic pole bodies 140 belonging to systems B-1 and B-2. Therefore, when one system fails, the stator is prone to undulating elastic deformation in the circumferential direction such that vibration increases compared to when both systems are operating normally. That is, when both systems are operating normally, the vibration caused by elastic deformation of the stator 130 is negligible. When one system fails, however, the vibration caused by elastic deformation of the stator 130 increases.

Figure 6:
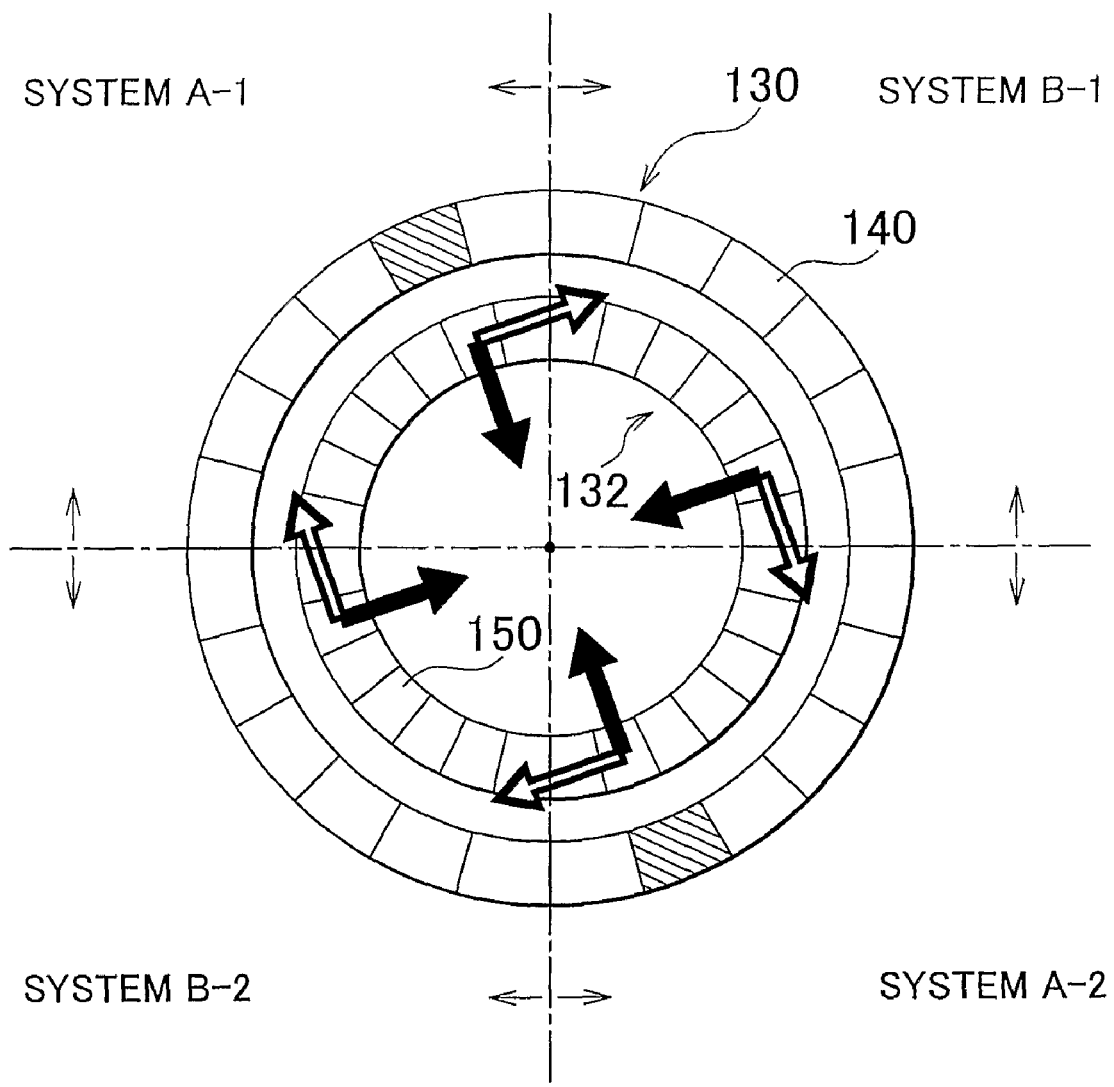
FIG. 6 is a view showing a frame format of force in the radial and circumferential directions acting on a permanent magnet of a rotor of the steering motor.

Next, the relative displacement between the rigid bodies of the rotor 132 and the stator 130 will be described. FIG. 6 view showing a frame format of force acting on the rotor 132. Both the force in the radial direction indicated by the black arrows and the force in the circumferential direction indicated by the outline arrows act on the magnets 150 of the rotor 132. The force in the radial direction that acts on a given magnet 150 basically cancels out the force in the radial direction that acts on the magnet 150 positioned on the other end of that magnet 150 (i.e., acts on the magnet that is positioned axially opposite the given magnet when the rotational axis is used as the axis of symmetry). However, when power is supplied to two opposing magnetic pole bodies 140 from different inverters 220A and 220B, for example, the forces in the radial direction that act on the two opposing magnets 150 may not always cancel each other out evenly. This is, because it is difficult to accurately synchronize the supply of power from different inverters 220A and 220B, the timing at which power is supplied may become off, and as a result, the timing at which the opposing two magnetic pole bodies 140 generate magnetism becomes off. As a result, the disproportion in the power in the radial direction caused by the timing being off causes the rotor 132 and the stator 130 to move relative to one another in the radial direction, and this relative movement between these two rigid bodies produces vibration. That is, vibration occurs due to the relative displacement between the rotor 132 and the stator 130. For example, as described above, when the plurality of magnetic pole bodies 140 are divided into two groups each of which includes a plurality of magnetic pole bodies 140 arranged in succession in a semicircle, vibration that is relatively small yet too large to be ignored is produced because it is difficult to accurately synchronize the power as described above even when the systems are operating normally. In contrast, in this example embodiment, same phase power is supplied from the same inverter 220 to two opposing magnetic pole bodies 140 so the power is consequently accurately synchronized. As a result, vibration when the systems are operating normally, i.e., vibration caused by relative displacement between the rigid bodies of the rotor 132 and the stator 130, can be reduced to a negligible level.

In FIG. 6, force in the direction that intersects both the radial and circumferential directions and is parallel to a plane perpendicular to the rotational axis actually acts between the magnets 150 and the magnetic pole bodies 140, but in the drawing that force is shown broken into its radial and circumferential components. Also in FIG. 6, the force in the radial direction is shown as inward force but the direction changes (i.e., either inward or outward) depending on the positional relationship between the magnets 150 and the magnetic pole bodies 140 and the polarity of the magnetism generated by the magnetic pole bodies 140.

As is evident from the foregoing description, in the steering motor 78, (a) the stator 130 is divided into two systems so that even if one system fails the wheels 16 can still be steered by the other system, (b) same phase power is supplied from the same inverter 220 to two opposing magnetic pole bodies 140 so vibration during normal operation of the systems is reduced, and (c) when one system fails, the plurality of magnetic pole bodies, arranged in succession, are able to move relatively freely in the radial direction so vibration caused by elastic deformation of the stator 130 increases and that vibration or vibration noise alerts the driver that there is an abnormality in the steering system.

In the foregoing example, the abnormality is in the steering system. However, if there is an abnormality in the steering reaction force system, e.g., if one of the magnetic pole bodies of the reaction force motor 30 becomes disconnected or if one of the two inverters 222A or 222B can no longer supply power, steering reaction force is applied to the steering wheel 14 by the reaction force system of the system that is operating normally, similar to the case of the steering motor 78. Also, if one of the ECUs 200A or 200B fails, the wheels 16 are steered and the steering reaction force is applied by the system that is operating normally. Incidentally, failure of the ECUs 200A and 200B is detected by a signal that is normally mutually output is no longer output. If both systems in the steering system, the steering reaction system, or both fail, power stops being supplied to the electromagnetic clutch 184 and the operating portion 10 and the steering portion 12 become mechanically connected so that the wheels 16 may be steered by the operating force of the steering wheel 14.

In the foregoing example embodiment, the stator 130 is divided into two systems. Alternatively, however, the stator 130 may also be divided into three or more systems. Dividing the stator in more systems further improves the fail-safe performance of the motor. However, that the stator 130 may also be divided into no more than six systems from the viewpoint of the stator 130 vibrating in the event that some of the systems fail. In the foregoing example embodiment, the reaction motor 30 and the steering motor 78 are described as examples of the steering system motor, but a steering assist motor may also be provided as the steering system motor in the steering system. The steering assist motor is used as the power source of the power steering system and assists the driver with the steering operation. In the foregoing example embodiment, the steering motor 78 has 24 slots and 28 poles. Alternatively, however, the steering motor 78 may have, for example, 12 slots and 14 poles, 12 slots and 8 poles, or various other combinations of slots and poles. However, it is desirable that there be an even number of slots so that two magnetic pole bodies 140 oppose one another. Also, it is desirable that there be at least three magnetic pole bodies arranged in succession in order to receive the supply of three-phase alternating current, in which case the number of slots would be at least 12.

In the foregoing example embodiment, dividing the plurality of magnetic pole bodies 140 into groups of separate systems enables the steering motor 78 to be perceived as having the stator 130 divided into separate systems. If the group of magnetic pole bodies 140 belonging to one system is considered as a single stator, the steering motor 78 may also be perceived as having a plurality of stators of separate systems (two in this example embodiment), as well as be perceived as having a plurality of stators that are combined. For that matter, if one of the groups of magnetic pole bodies 140 fails, the steering motor 78 completed functionality will not be lost because other groups of magnetic pole bodies 140 are present so the steering motor 78 can also be thought of as being redundant. By changing the manner in which power is supplied, the steering motor 78 may be operated just like a normal motor without changing the structure or arrangement, etc., of the magnetic pole bodies 140. Therefore, the stator 130 is essentially divided by dividing the power supply systems. From this viewpoint, the steering motor 78 may also be considered as being a motor having divided power supply systems.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A steering system motor arranged in a steering system that changes a direction in which a wheel is pointed according to an operation of an operating member, the motor comprising:

a stator in which a plurality of magnetic pole bodies, each of which has a coil that generates magnetism when power is supplied, are arranged in a circle;

a rotor positioned such that an outer peripheral surface of the rotor opposes an inner peripheral surface of the stator or positioned such that an inner peripheral surface of the rotor opposes an outer peripheral surface of the stator; and a power supply device that supplies three-phase power to the plurality of magnetic pole bodies of the stator, wherein the plurality of magnetic pole bodies is divided into a plurality of magnetic pole body groups, each of the plurality of magnetic pole body groups is divided into a first group and a second group, each of the first group and the second group includes a same number of magnetic pole bodies, the number being a multiple of three, the magnetic pole bodies belonging to the first group are arranged adjacent to each other in a circumferential direction of the stator, the magnetic pole bodies belonging to the second group are arranged opposing the magnetic pole bodies belonging to the first group in a diameter direction of the stator so that a row including half of the magnetic pole bodies belonging to each of the magnetic pole body groups is adjacent to a row including half of the magnetic pole bodies belonging to the other magnetic pole body group in the circumferential direction, the power supply device includes a plurality of power supply portions each of which supplies power to a corresponding one of the magnetic pole body groups, a number of the power supply portions corresponding with a number of the magnetic pole body groups, the power supply portions being independent of each other, and the power supply portions supply same phase power to the magnetic pole bodies that oppose each other in the diameter direction to generate magnetism that acts on the rotor in mutually reverse directions in the diameter direction.

2. The steering system motor according to claim 1, wherein an order of phases of the three-phase power supplied by the plurality of power supply portions to the magnetic pole bodies in each of the plurality of magnetic pole body groups is the same for each magnetic pole body group.

3. The steering system motor according to claim 1, wherein each of the plurality of power supply portions supplies three-phase alternating current as the three-phase power.

4. The steering system motor according to claim 1, wherein the steering system motor is provided in a steering apparatus of the steering system that steers the wheel without using operating force of the operating member, and serves as a power source of the steering apparatus.

5. The steering system motor according to claim 1, wherein the steering system motor is a steering assist motor that assists a driver with a steering operation.

6. The steering system motor according to claim 1, wherein the magnetic pole bodies have an even number of slots.

7. The steering system motor according to claim 1, wherein when power cannot be supplied to the magnetic pole bodies in one of the magnetic pole body groups, the power supply portion of the magnetic pole body group in which power continues to be supplied supplies a larger amount of power than when power is being supplied to all of the magnetic pole body groups.

* * * * *